United States Patent [19]

Breglia et al.

[11] 4,348,185
[45] Sep. 7, 1982

[54] WIDE ANGLE INFINITY DISPLAY SYSTEM

[75] Inventors: Denis R. Breglia, Altamonte Springs; Alfred H. Rodemann, Maitland, both of Fla.

[73] Assignee: The United States of America as represented by the Secretary of the Navy, Washington, D.C.

[21] Appl. No.: 121,553

[22] Filed: Feb. 14, 1980

[51] Int. Cl.³ .............................................. G09B 9/08
[52] U.S. Cl. ....................................... 434/43; 434/44
[58] Field of Search ...................... 434/21, 29, 30, 44; 358/104, 183

[56] References Cited

U.S. PATENT DOCUMENTS

| | | | |
|---|---|---|---|
| 3,131,487 | 5/1964 | Lyon et al. | 434/38 |
| 4,048,653 | 9/1977 | Spooner | 358/104 |
| 4,100,571 | 7/1978 | Dykes et al. | 434/44 |
| 4,103,435 | 8/1978 | Herndon | 358/104 |
| 4,310,849 | 1/1982 | Glass | 358/88 |

Primary Examiner—Vance Y. Hum
Assistant Examiner—Leo P. Picard
Attorney, Agent, or Firm—Robert F. Beers; Robert W. Adams; David S. Kalmbaugh

[57] ABSTRACT

A wide angle infinity display system to be utilized by a trainee pilot for observing a visual scene displayed upon a retroreflective screen. The system includes a helmet adapted to be worn by the trainee pilot, image producing means for generating visual information, image forming means mounted upon the helmet for projecting the visual information onto the retroreflective screen so as to form the visual scene observed by the trainee pilot, and communicating means for transmitting the visual information from the image producing means to the image forming means. Position monitoring means coupled to the helmet sense angular movement of the head of the trainee pilot, and the visual scene is changed correspondingly, to permit scanning of a wide angle field of view.

9 Claims, 3 Drawing Figures

WIDE ANGLE INFINITY DISPLAY SYSTEM

BACKGROUND OF THE INVENTION

1. Field of the Invention

This invention relates generally to visual display systems. In particular, this invention relates to a wide angle visual display system for providing a wide angle visual display to trainee pilots, for example the scene from an aircraft.

2. Description of the Prior Art

At present, there are available a wide variety of visual display systems which may be utilized as aircraft training simulators for the viewing of a visual scene by a trainee pilot.

Most such visual display systems of the prior art fall into two general classes, real image display systems in which the trainee pilot directly views a real image projected onto a retroreflective screen or the like, and virtual image display systems in which the trainee pilot looks at a real image through intervening optics which produce a virtual image at optical infinity.

Real image display systems, which include motion picture displays, closed circuit television systems, and the like, simulate the appearance of real world objects by positioning the retroreflective screen, which is utilized to display the real world objects, at a considerable distance from the trainee pilot. However, the aforementioned systems of the prior art ordinarily leave something to be desired in that the real image display systems utilize large size screens, and require considerable light to form the real image on the screen.

Virtual image display systems, which utilize reflective or refractive optics to relay a small real image to the trainee pilot as a large virtual image at optical infinity, overcome the size and brightness disadvantages of real image displays. However, the aforementioned virtual image display systems of the prior art require expensive special purpose optical components to simulate a wide field of view. Further, virtual image display systems tend to be pupil forming, thereby placing restrictions on the position and movement of the trainee pilot's head.

SUMMARY OF THE INVENTION

The subject invention overcomes some of the disadvantages of the prior art, including those mentioned above, in that it comprises a relatively simple wide angle visual display system which may be utilized by a trainee pilot to observe a visual scene displayed upon a retroreflective screen.

Included in the subject invention is a helmet adapted to be worn upon the head of the trainee pilot, and position monitoring means coupled to the helmet for producing pitch, roll, and yaw control signals which are responsive to the angular movement of the trainee pilot's head. The pitch, roll, and yaw control signals are then supplied to a computer which processes the aforementioned control signals in accordance with a flight simulation program, and provides in response to the processing of the pitch, roll, and yaw control signals a position control signal.

Image producing means generates visual information, which is oriented in accordance with the angular movement of the trainee pilot's head in response to the position control signal provided by the computer. Communicating means transmits the visual information to image forming means which is mounted on the helmet worn by the trainee pilot. The visual information is then projected onto a retroreflective screen by the image forming means, thereby causing a visual scene to appear on the screen such that the trainee pilot may observe the aforementioned visual scene.

DESCRIPTION OF THE PREFERRED EMBODIMENT

Figure 1:
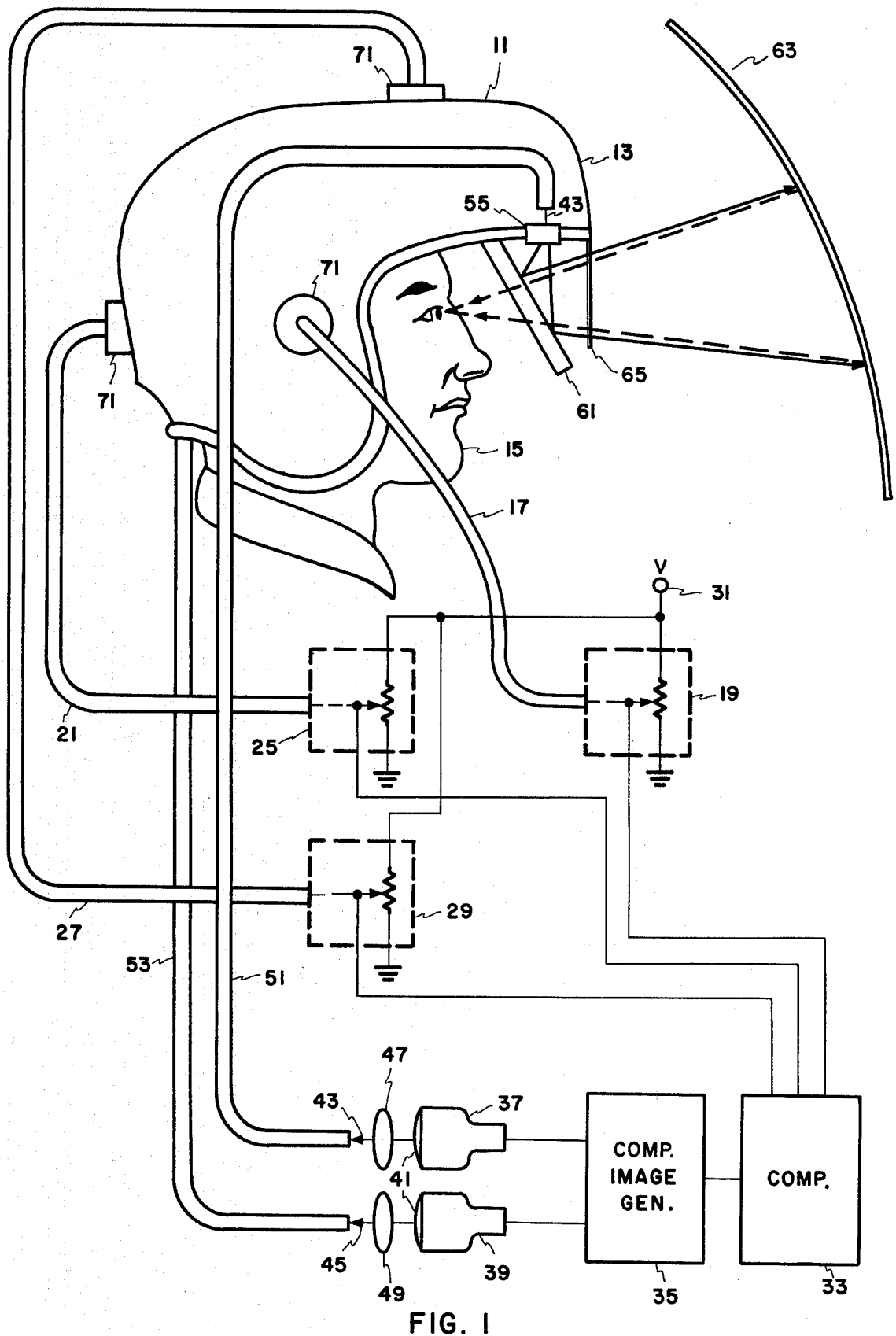
FIG. 1 is a diagrammatic illustration, partially in block form, showing the overall organization of the subject invention.

The preferred embodiment of the subject invention will now be discussed in some detail in conjunction with all of the figures of the drawing, wherein like parts are designated by like reference numerals, insofar as it is practicable and possible to do so.

Referring now to FIG. 1, there is shown a wide angle visual display system 11 which includes a helmet 13 adapted to be worn upon the head of a trainee pilot 15. Connected to the right side of helmet 13, adjacent the right ear of trainee pilot 15, is one end of a cable 17. The opposite end of cable 17 is mechanically connected to the movable arm of a potentiometer 19. In the alternative, if so desired, cable 17 may be connected to the left side of helmet 13 adjacent the left ear of trainee pilot 15 without altering the operation of the subject invention as will be discussed more fully below.

Connected to the rear of helmet 13 at the center thereof is one end of a cable 21. The opposite end of cable 21 is mechanically connected to the movable arm of a potentiometer 25.

Similarly, connected to the top of helmet 13 at the center thereof is one end of a cable 27. The opposite end of cable 27 is mechanically connected to the movable arm of a potentiometer 29.

The output of a direct current voltage source 31 is connected to the fixed resistance of each of the aforementioned potentiometers 19, 25, and 29, the movable arms of which are respectively connected to the first, second, and third inputs of a computer 33. The output of computer 33 is, in turn, connected to the input of a computer image generator 35, with the first output thereof connected to the input of a cathode ray tube 37 and the second output thereof connected to the input of a cathode ray tube 39.

At this time, it may be noteworthy to mention that computer 33 may be any conventional, well known, and commercially available computer such as, for example, a Model SEL 32/55 computer manufactured by Systems Engineering Lab., Inc., of Fort Lauderdale, Fla. In addition, it may be mentioned that computer image generator 35 may be any conventional and well known computer image generator such as the Comp-U-Scene manufactured by General Electric, Inc.

Figure 2:
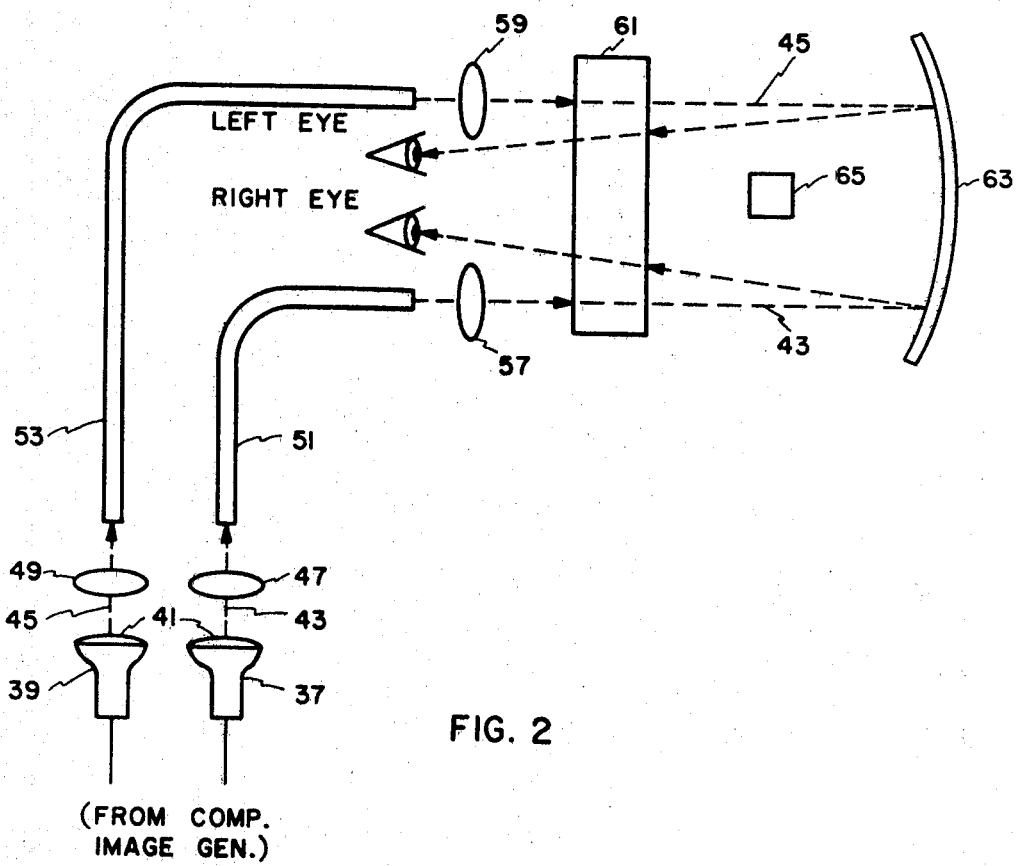
FIG. 2 is a diagrammatic illustration of the optical elements of the invention of FIG. 1.

Referring now to FIGS. 1 and 2, there is shown cathode ray tubes 37 and 39, each of which has on the front face thereof a screen 41. As will be discussed more fully below, cathode ray tubes 37 and 39 respectively broadcast along optical paths 43 and 45 visual information which is supplied to the aforementioned cathode ray tubes by computer image generator 35.

Spatially disposed downstream from cathode ray tube 37 along optical path 43 is a lens 47 which has a focal length of 50 mm and an objective aperture of f/1.9. In a like manner, spatially disposed downstream from cathode ray tube 39 along optical path 45 is a lens 49 which has a focal length of 50 mm and an objective aperture of f/1.9.

Spatially disposed downstream from lens 47 along optical path 43 is a coherent fiber optics bundle 51 which is secured to the right side of helmet 13 by a plurality of standoffs, not shown. Similarly, spatially disposed downstream from lens 49 along optical path 45 is a coherent fiber optics bundle 53 which is secured to the left side of helmet 13 by a plurality of standoff, not shown. Each of the aforementioned coherent fiber optics bundles has therein a plurality of fibers, not shown, and may be any conventional and commercially available fiber optics bundle, such as, for example, Fiber Optics Bundle Model FS-163 manufactured by American Optical, Inc., of Keene, N.H.

Spatially disposed downstream from coherent fiber optics bundle 51 along optical path 43 and mounted to the right side of helmet 13 by means of a lens holder 55 is a lens 57. Spatially disposed downstream from fiber optics bundle 53 along optical path 45 and mounted to the left side of helmet 13 by means of a lens holder, not shown, is a lens 59. Each of the aforementioned lenses 57 and 59 has a focal length of 9.5 mm and an effective aperture of f/1.4.

Spatially disposed downstream from lens 57 along optical path 43 and lens 59 along optical path 45, and fixedly attached to the front of helmet 13 is a beam splitter 61. Beam splitter 61 may be fabricated from a transparent material such as plastic, and is characterized as being in the shape of a trapezoid.

Spatially disposed downstream from beam splitter 61 along optical paths 43 and 45 is a retroreflective screen 63. Retroreflective screen 63 may be fabricated from any highly reflective material such as, for example, Scotchlite Reflective Sheeting, manufactured by 3M Company of St. Paul, Minn.

Located between optical paths 43 and 45 downstream from beam splitter 61 and attached to the front of helmet 13 is a partition 65.

Figure 3:
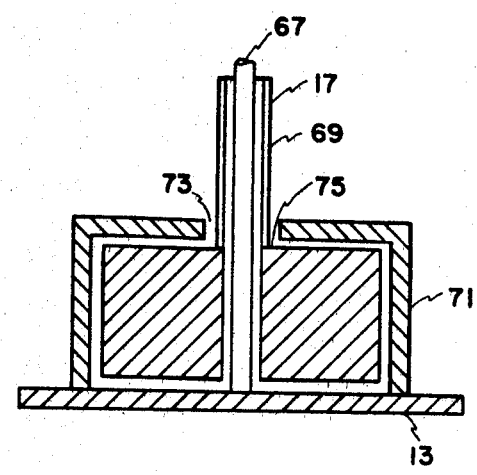
FIG. 3 is a sectional view of the means utilized to connect a cable to the helmet of the invention of FIG. 1.

Referring now to FIGS. 1 and 3, there is shown in FIG. 3 a sectional view of the means utilized to connect cables 17, 21, and 27 to helmet 13. Each of the aforementioned cables 17, 21, and 27 includes a rod 67 which is fixedly attached to helmet 13, and a shield 69.

Since cables 21 and 27 are connected to helmet 13 in exactly the same manner as cable 17 is connected to helmet 13, only cable 17 is illustrated in FIG. 3. Connected to helmet 13 on the outer surface thereof are a trio of bearing housings 71, each of which has an aperture 73 positioned in the center thereof. Located within each bearing housing 71 is a bearing 75 which is attached to shield 69 of each of the aforementioned cables 17, 21, and 27.

As will be discussed more fully below, whenever trainee pilot 15 rotates his head in an angular direction, one or more of the cables 17, 21, and/or 27 will rotate with helmet 13. This, in turn, causes rod 67 of at least one of the cables 17, 21, and/or 27 to rotate with helmet 13. However, each of the shields 69 remains in a fixed position relevant to helmet 13 so as to prevent the kinking of cables 17, 21, and/or 27.

The operation of the subject invention will now be discussed in conjunction with all of the figures of the drawings.

Referring now to FIGS. 1 and 2, there is shown computer image generator 35 which produces visual information to be supplied to the inputs of cathode ray tubes 37 and 39. The visual information, which appears on screen 41 of cathode ray tubes 37 and 39 as visual images, is then broadcast along optical paths 43 and 45 respectively by cathode ray tubes 37 and 39.

The visual information which is broadcast along optical path 43 is reduced by lens 47 so as to allow the transmission thereof through fiber optics bundle 51 to lens 57. Similarly, the visual information which is broadcast along optical path 45 is reduced by lens 49 so as to allow the transmission thereof through fiber optics bundle 53 to lens 59.

The visual information transmitted along optical paths 43 and 45 is then magnified by lenses 57 and 59 so as to allow the projection thereof by beam splitter 61 onto retroreflective screen 63, and thereby form on retroreflective screen 63 a visual scene to be observed by trainee pilot 15.

At this time it may be noteworthy to mention that the visual information of optical path 43, when projected onto retroreflective screen 63 by beam splitter 61, overlaps, in the horizontal field of view of trainee pilot 15, with the visual information of optical path 45 when projected onto retroreflective screen 63 by beam splitter 61. This, in turn, causes the visual scene observed by trainee pilot 15 to appear at optical infinity so as to achieve the effect of binocular vision. The horizontal field of view observed by trainee pilot 15 is approximately one hundred degrees with an overlap region of twenty degrees, and the vertical field of view of trainee pilot 15 is approximately sixty degrees. In addition to providing for an optical infinity effect, the use of dual optical paths 43 and 45 allows the simultaneous presentation of images which vary from one another so as to present a stereoscopic effect.

In addition, it may be noteworthy to mention at this time that partition 65 divides trainee pilot's 15 line of sight such that the left eye of trainee pilot 15 is unable to observe that part of the visual image displayed upon retroreflective screen 63 intended for observation by the right eye of trainee pilot 15. Similarly, the right eye of trainee pilot 15 is unable to observe that part of the visual image displayed upon retroreflective screen 63 intended for observation by the left eye of trainee pilot 15.

Referring now to FIGS. 1 and 3, position monitoring of the head of trainee pilot 15 is achieved by utilizing potentiometers 19, 25, and 29. For example, rotational movement of the head of trainee pilot 15 about his right ear rotates rod 67 of cable 17 so as to provide at the output of the movable arm of potentiometer 19 a pitch control signal which is proportional to the angular movement of the head of trainee pilot 15 about his right ear. Similarly, angular movement of the head of trainee pilot 15 which rotates the shaft of cable 21 will result in a roll control signal being provided at the output of the movable arm of potentiometer 25. Angular movement of the head of trainee pilot 15 which rotates the shaft of cable 27 will result in a yaw control signal being provided at the output of the movable arm of potentiometer 29.

The pitch, roll, and yaw control signals respectively provided by potentiometers 19, 25, and 29 are then supplied to the first, second, and third inputs of computer 33 which processes the aforementioned control signals in accordance with a flight simulation program, and provides at the output thereof a position control signal in response to the processing of the pitch, roll, and yaw control signals.

At this time it may be noteworthy to mention that the programming techniques utilized to generate the flight simulation program of computer 33 are well known in the art of helmet mounted visual display systems, as is illustrated in U.S. Pat. No. 4,048,653, entitled Visual Display Apparatus, by A. M. Spooner.

The position control signal provided by computer 33 is then supplied to the input of computer image generator 35 so as to orientate the visual information provided thereby in accordance with the angular movement of the head of trainee pilot 15. Thus, whenever trainee pilot 15 moves his head in an angular direction the visual image observed by trainee pilot 15 upon retroreflective screen 63 will appear fixed in space.

From the foregoing, it may be seen that the subject invention comprises a new, unique, and exceedingly useful helmet mounted visual display system which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A wide angle infinity display system comprising in combination:
   a helmet adapted to be worn upon the head of a trainee pilot;
   position monitoring means, having first, second, and third outputs, for sensing the angular movement of the head of said trainee pilot, and for producing pitch, roll, and yaw control signals indicative of such angular movement, said position monitoring means comprising:
   first, second, and third potentiometers, each of which has a fixed resistance and a movable arm in slidable contact with said fixed resistance,
   a first cable having one end thereof in rotatable engagement with one side of said helmet, and the opposite end thereof connected to the movable arm of said first potentiometer, a second cable having one end thereof in rotatable engagement with the rear of said helmet and the opposite end thereof connected to the movable arm of said second potentiometer, a third cable having one end thereof in rotatable engagement with the top of said helmet and the opposite end thereof connected to the movable arm of said third potentiometer, and a direct current voltage source having an output connected to the fixed resistance of said first, second, and third potentiometers;
   computing means having first, second, and third inputs respectively connected to the first, second, and third outputs of said position monitoring means, and an output adapted for processing the pitch, roll, and yaw control signals produced by said position monitoring means in accordance with a flight simulation program, and for providing at the output thereof a position control signal in response to the processing of said pitch, roll, and yaw control signals by the flight simulation program of said computing means;
   image producing means having an input connected to the output of said computing means for generating visual information, the visual information generated by said image producing means to be oriented in accordance with the angular movement of the head of said trainee pilot in response to the position control signal provided by said computing means;
   image forming means mounted upon said helmet and secured thereto adapted for projecting upon a retroreflective screen the visual information provided by said image producing means so as to form upon said screen a visual scene to be observed by said trainee pilot; and
   multiple path communicating means positioned between said image producing means and said image forming means for transmitting therebetween the visual information by said image producing means.

2. The wide angle infinity display system according to claim 1, wherein said computing means comprises a computer.

3. The wide angle infinity display system according to claim 1, wherein said image producing means comprises:
   a computer image generator having an input connected to the output of said computing means and a pair of outputs, each output having separate image producing capability;
   a first cathode ray tube having a screen thereon, and an input connected to the first of the pair of outputs of said computer image generator;
   a first lens spatially disposed downstream from the screen of said first cathode ray tube;
   a second cathode ray tube having a screen thereon, and an input connected to the second of the pair of outputs of said computer image generator; and
   a second lens spatially disposed downstream from the screen of said second cathode ray tube.

4. The wide angle infinity display system according to claim 1, wherein said image generating means comprises:
   a first lens mounted on one side of said helmet;
   a second lens mounted on the opposite side of said helmet;
   a beam splitter fixedly attached to the front of said helmet being spatially disposed downstream from the first and second lenses mounted on said helmet.

5. The wide angle infinity display system according to claim 1, wherein said communicating means comprises a pair of coherent fiber optics bundles.

6. The wide angle infinity display system according to claim 1, further characterized by a partition attached to the front of said helmet so as to divide the line of sight of said trainee pilot between the right eye and the left eye of said trainee pilot.

7. A binocular viewing device comprising in combination:
   a helmet adapted to be worn upon the head of a trainee pilot;
   position monitoring apparatus directly attached to said helmet along mutually orthogonal axes and having first, second, and third outputs relative to rotation thereabout for sensing the angular movement of the head of said trainee pilot, and for producing pitch, roll, and yaw control signals indicative of such angular movement;

a computer having first, second and third inputs respectively connected to the first, second, and third outputs of said position monitoring apparatus, and an output adapted for processing the pitch, roll, and yaw control signals produced by said position monitoring apparatus in accordance with a flight simulation program, and for providing at the output thereof a position control signal in response to the processing of said pitch, roll, and yaw control signals by the flight simulation program of said computer;

a computer image generator having an input connected to the output of said computer, and first and second outputs for producing visual information, the visual information generated by said computer image generator to be orientated in accordance with the angular movement of the head of said trainee pilot in response to the position control signal provided by said computer;

a first cathode ray tube having an input connected to the first output of said computer image generator adapted for broadcasting visual images along a first optical path in response to the visual information produced by said computer;

a second cathode ray tube having an input connected to the second output of said computer adapted for broadcasting visual images along a second optical path in response to the visual information produced by said computer;

a first lens spatially disposed from said first cathode ray tube along said first optical path for reducing the visual images broadcast by said first cathode ray tube;

a second lens spatially disposed from said second cathode ray tube along said second optical path for reducing the visual images broadcast by said second cathode ray tube;

a first fiber optics bundle spatially disposed from said first lens along said first optical path for transmitting along said first optical path the visual images reduced by said first lens;

a second fiber optics bundle spatially disposed from said second lens along said second optical path for transmitting along said second optical path the visual image reduced by said second lens;

a third lens spatially disposed from said first fiber optics bundle along said first optical path for magnifying the visual images transmitted along said first optical path by said first fiber optics bundle;

a fourth lens spatially disposed from said second fiber optics bundle along said second optical path for magnifying the visual image transmitted along said second optical path by said second fiber optics bundle; and a beam splitter spatially disposed from said third and fourth lenses along said first and second optical paths adapted for projecting onto a retroreflective screen the visual images magnified by said third and fourth lenses so as to form a visual scene to be observed by said trainee pilot.

8. The binocular viewing device according to claim 7, wherein said position monitoring apparatus comprises:

first, second, and third potentiometers, each of which has a fixed resistance and a movable arm in slidable contact with said fixed resistance;

a first cable having one end thereof in rotatable engagement with one side of said helmet, and the opposite end thereof connected to the movable arm of said first potentiometer;

a second cable having one end thereof in rotatable engagement with the rear of said helmet, and the opposite end thereof connected to the movable arm of said second potentiometer;

a third cable having one end thereof in rotatable engagement with the top of said helmet and the opposite end thereof connected to the movable arm of said third potentiometer; and a direct current voltage source having an output connected to the fixed resistance of said first, second, and third potentiometers.

9. The binocular viewing device according to claim 7, further characterized by a partition spatially disposed downstream from said beam splitter between said first and second optical paths adapted for dividing the line of sight of said trainee pilot between the right eye and left eye of said trainee pilot.

* * * * *